US008134782B2

(12) United States Patent  (10) Patent No.: US 8,134,782 B2
Archambeau et al.  (45) Date of Patent: Mar. 13, 2012

(54) TRANSPARENT OPTICAL COMPONENT HAVING CELLS FILLED WITH OPTICAL MATERIAL

(75) Inventors: Samuel Archambeau, Charenton le Pont (FR); Christian Bovet, Charenton le Pont (FR); Jean-Paul Cano, Charenton le Pont (FR); Sylvie Vinsonneau, Charenton le Pont (FR)

(73) Assignee: Essilor International (compagnie Generale d'optique), Charenton le Pont (FR)

( * ) Notice: Subject to any disclaimer, the term of this patent is extended or adjusted under 35 U.S.C. 154(b) by 50 days.

(21) Appl. No.: 12/522,200

(22) PCT Filed: Jan. 15, 2008

(86) PCT No.: PCT/FR2008/050065
§ 371 (c)(1),
(2), (4) Date: Jul. 6, 2009

(87) PCT Pub. No.: WO2008/099117
PCT Pub. Date: Aug. 21, 2008

(65) Prior Publication Data
US 2010/0039611 A1    Feb. 18, 2010

(30) Foreign Application Priority Data

Jan. 17, 2007 (FR) ...................... 07 00309

(51) Int. Cl.
*G02B 3/12* (2006.01)
*G02C 7/02* (2006.01)
(52) U.S. Cl. .................. 359/665; 351/159; 351/177

(58) Field of Classification Search .......... 359/665–667; 351/159; 623/6.13
See application file for complete search history.

(56) References Cited

U.S. PATENT DOCUMENTS

| 2,196,066 A | 4/1940 | Feinbloom |
| 2,511,329 A | 6/1950 | Craig |
| 3,460,960 A | 8/1969 | Francel et al. |
| 3,532,038 A | 10/1970 | Rottmann et al. |
| 3,628,854 A | 12/1971 | Jampolsky |
| 3,978,580 A | 9/1976 | Leupp et al. |

(Continued)

FOREIGN PATENT DOCUMENTS

AU  779628  2/2005
(Continued)

OTHER PUBLICATIONS

Perez, "Optique-Fondement et Applications." DUNOD, 7$^{th}$ Edition, Paris 2004, p. 262.
(Continued)

*Primary Examiner* — Jordan Schwartz
(74) *Attorney, Agent, or Firm* — Occhiuti Rohlicek & Tsao LLP

(57) ABSTRACT

A transparent optical component having cells (1) filled with an optical material is proposed, which has a high transparency. The cells of the component are filled to levels ($h_1, \ldots, h_5$) which vary randomly, and the variations of which are adapted so as not to cause a perceptible optical defect. To do this, the fill levels of the cells are adapted so that the phase shifts experienced by the light rays ($R_1, \ldots, R_5$) which pass through the cells have a root mean square deviation of less than one quarter of the wavelength (1). Such a component may in particular be an ophthalmic lens.

19 Claims, 1 Drawing Sheet

U.S. PATENT DOCUMENTS

| | | | |
|---|---|---|---|
| 4,150,878 | A | 4/1979 | Barzilai et al. |
| 4,268,132 | A | 5/1981 | Neefe |
| 4,601,545 | A | 7/1986 | Kern |
| 4,621,912 | A | 11/1986 | Meyer |
| 4,720,173 | A | 1/1988 | Okada et al. |
| 4,791,417 | A | 12/1988 | Bobak |
| 4,994,664 | A | 2/1991 | Veldkamp |
| 5,017,000 | A | 5/1991 | Cohen |
| 5,044,742 | A | 9/1991 | Cohen |
| 5,067,795 | A | 11/1991 | Senatore |
| 5,139,707 | A | 8/1992 | Guglielmetti et al. |
| 5,233,038 | A | 8/1993 | Guglielmetti et al. |
| 5,359,444 | A | 10/1994 | Piosenka et al. |
| 5,529,725 | A | 6/1996 | Guglielmetti et al. |
| 5,576,870 | A | 11/1996 | Ohmae et al. |
| 5,585,968 | A | 12/1996 | Guhman |
| 5,604,280 | A | 2/1997 | Pozzo et al. |
| 5,699,142 | A | 12/1997 | Lee et al. |
| 5,733,077 | A | 3/1998 | MacIntosh |
| 5,763,054 | A | 6/1998 | Samec et al. |
| 5,764,333 | A | 6/1998 | Somsel |
| 5,774,273 | A | 6/1998 | Bornhorst |
| 5,805,263 | A | 9/1998 | Reymondet et al. |
| 5,807,906 | A | 9/1998 | Bonvallot et al. |
| 5,812,235 | A | 9/1998 | Seidner et al. |
| 5,905,561 | A | 5/1999 | Lee et al. |
| 5,914,802 | A | 6/1999 | Stappaerts et al. |
| 6,019,914 | A | 2/2000 | Lokshin et al. |
| 6,118,510 | A | 9/2000 | Bradshaw et al. |
| 6,199,986 | B1 | 3/2001 | Williams et al. |
| 6,259,501 | B1 | 7/2001 | Yaniv |
| 6,274,288 | B1 | 8/2001 | Kewitsch et al. |
| 6,281,366 | B1 | 8/2001 | Frigoli et al. |
| 6,301,051 | B1 | 10/2001 | Sankur |
| 6,307,243 | B1 | 10/2001 | Rhodes |
| 6,309,803 | B1 | 10/2001 | Coudray et al. |
| 6,327,072 | B1 | 12/2001 | Comiskey et al. |
| 6,449,099 | B2 | 9/2002 | Fujimoto et al. |
| 6,485,599 | B1 | 11/2002 | Glownia et al. |
| 6,577,434 | B2 | 6/2003 | Hamada |
| 6,597,340 | B1 | 7/2003 | Kawai |
| 6,707,516 | B1 | 3/2004 | Johnson et al. |
| 6,712,466 | B2 | 3/2004 | Dreher |
| 6,871,951 | B2 | 3/2005 | Blum et al. |
| 6,934,088 | B2 | 8/2005 | Lai et al. |
| 6,963,435 | B2 | 11/2005 | Mallya et al. |
| 6,987,605 | B2 | 1/2006 | Liang et al. |
| 7,036,929 | B1 | 5/2006 | Harvey |
| 7,144,529 | B1 | 12/2006 | Mercier |
| 7,227,692 | B2 | 6/2007 | Li et al. |
| 7,289,260 | B2 | 10/2007 | Kaufman et al. |
| 7,404,637 | B2 | 7/2008 | Miller et al. |
| 7,533,453 | B2 | 5/2009 | Yancy |
| 7,715,107 | B2 * | 5/2010 | Loopstra et al. ............. 359/666 |
| 2002/0008898 | A1 | 1/2002 | Katase |
| 2002/0016629 | A1 | 2/2002 | Sandstedt et al. |
| 2002/0080464 | A1 | 6/2002 | Bruns |
| 2002/0114054 | A1 | 8/2002 | Rietjens |
| 2002/0140899 | A1 | 10/2002 | Blum et al. |
| 2002/0145797 | A1 | 10/2002 | Sales et al. |
| 2002/0167638 | A1 | 11/2002 | Byun et al. |
| 2002/0176963 | A1 | 11/2002 | Chen et al. |
| 2003/0003295 | A1 | 1/2003 | Dreher |
| 2003/0021005 | A1 | 1/2003 | Liang et al. |
| 2003/0035199 | A1 | 2/2003 | Liang et al. |
| 2003/0081172 | A1 | 5/2003 | Dreher |
| 2003/0085906 | A1 | 5/2003 | Elliott et al. |
| 2003/0143391 | A1 | 7/2003 | Lai |
| 2003/0147046 | A1 | 8/2003 | Shadduck |
| 2003/0152849 | A1 | 8/2003 | Chan-Park et al. |
| 2003/0174385 | A1 | 9/2003 | Liang et al. |
| 2003/0206260 | A1 | 11/2003 | Kobayashi et al. |
| 2004/0008319 | A1 | 1/2004 | Lai et al. |
| 2004/0027327 | A1 | 2/2004 | LeCain et al. |
| 2004/0114111 | A1 | 6/2004 | Watanabe |
| 2004/0120667 | A1 | 6/2004 | Aylward et al. |
| 2004/0125247 | A1 | 7/2004 | Seshan et al. |
| 2004/0125337 | A1 | 7/2004 | Boulineau et al. |
| 2004/0165252 | A1 | 8/2004 | Liang et al. |
| 2004/0169932 | A1 | 9/2004 | Esch et al. |
| 2004/0190115 | A1 | 9/2004 | Liang et al. |
| 2004/0233381 | A1 | 11/2004 | Kim et al. |
| 2006/0006336 | A1 * | 1/2006 | Cano et al. .................... 250/345 |
| 2006/0087614 | A1 | 4/2006 | Shadduck |
| 2006/0279848 | A1 | 12/2006 | Kuiper et al. |
| 2007/0152560 | A1 | 7/2007 | Naito et al. |
| 2008/0068723 | A1 | 3/2008 | Jethmalani et al. |
| 2008/0212018 | A1 | 9/2008 | Ballet et al. |
| 2008/0314499 | A1 | 12/2008 | Begon et al. |

FOREIGN PATENT DOCUMENTS

| | | |
|---|---|---|
| CA | 2340672 | 12/2000 |
| DE | 19714434 | 10/1998 |
| EP | 728572 | 8/1996 |
| EP | 1225458 | 7/2002 |
| EP | 1308770 | 5/2003 |
| FR | 2561005 | 9/1985 |
| FR | 2718447 | 10/1995 |
| FR | 2872589 | 1/2006 |
| WO | 00/77570 | 12/2000 |
| WO | 02/01281 | 1/2002 |
| WO | 02/065215 | 8/2002 |
| WO | WO03/012542 | 2/2003 |
| WO | 03/077012 | 9/2003 |
| WO | 03/102673 | 12/2003 |
| WO | 2004/015481 | 2/2004 |
| WO | 2004/034095 | 4/2004 |
| WO | 2004/051354 | 6/2004 |
| WO | 2005/033782 | 4/2005 |
| WO | 2006/013250 | 2/2006 |
| WO | 2006/050366 | 5/2006 |
| WO | 2006/067309 | 6/2006 |
| WO | 2007/010414 | 1/2007 |
| WO | 2007/023383 | 3/2007 |
| WO | 2007/144308 | 12/2007 |

OTHER PUBLICATIONS

Cognard, Philippe. "Colles et adhesifs pour emballages, Generalities," 18 pages (English Summary Provided), 2004.

Fowles, Grant R. Introduction to Modern Optics. New York: Dover Publications, 1989. Print. pp. 138-139.

Hecht, Eugene, "Optics, 4$^{th}$ Edition" 2002 Addison Wesley, p. 428 (XP002465206) (chapter 10 from 2$^{nd}$ edition provided).

Kaufman U.S. Appl. No. 60/507940, Drawing Sheets 4, 5, 2003.

David R. Lide, ed., CRC Handbook of Chemistry and Physics, 89th edition (internet version 2009), CRC Press/Taylor and Francis, Boca Raton, FL., pp. 10-12 through 10-13.

* cited by examiner

TRANSPARENT OPTICAL COMPONENT HAVING CELLS FILLED WITH OPTICAL MATERIAL

CROSS-REFERENCE TO RELATED APPLICATIONS

This application is the National Stage of International Application No. PCT/FR2008/050065, filed on Jan. 15, 2008, which claims the priority of French Application No. 0700309, filed on Jan. 17, 2007. The contents of both applications are hereby incorporated by reference in their entirety.

The present invention relates to a transparent optical component having cells filled with optical material, as well as a component of the type resulting from such a method.

BACKGROUND

It is known to produce a transparent optical component by forming a set of cells which are separate and juxtaposed parallel to a surface of the component (FR 2 872 259). Each cell is filled with a suitable optical material, so that the set of cells thus filled confers on the component a desired optical function. For example, the function of the component may be an optical power when the material which is contained in the cells has a variable optical refractive index. It may also be a protection against the sun when the optical material is absorbing, or may reinforce contrast when it is polarizing. The use of separate cells makes it possible to easily vary the intensity of the optical function of the component along the surface of the latter. Optionally, the optical material which is contained in the cells may also be an electro-active material, so that the optical function of the component can be controlled by an electrical command.

Such a method for the production of a transparent optical component is advantageous, in particular because it allows using of a same base component with cells in order to obtain final components which have different optical functions. These different functions are obtained by modifying the material or materials contained in the cells. One same base component model having cells can then be used for a large number of final optical components. It is then manufactured on a large scale, which contributes to reducing the cost price of each optical component.

Such a method is also advantageous because it makes it possible to customize the optical component easily according to its future user. The customization is carried out by adapting the optical material which is contained in the cells of the component according to characteristics determined specifically for this user. Such a customization is particularly suitable when the optical component is an ophthalmic lens, intended for an identified spectacle wearer.

Now filling the cells of such a component with optical material is likely to create a regular, even periodic variation on the surface of this component. For example, when the optical material is liquid, a meniscus can form at the opening section of each cell through which the filling is carried out. Other phenomena linked to the filling of the cells can also cause a regular or periodic variation. Such a variation, even if slight, can then result in light diffusion which reduces the transparency of the optical component and to introduces defects in the image, such as for example ghost images, if the variations are periodic.

Within the meaning of the invention, an optical component is considered to be transparent when an image which is observed through this component is perceived without significant loss of contrast. In other words, the interposition of the transparent optical component between the image and an observer of the latter does not significantly reduce the quality of the image. In particular, diffraction is defined as the phenomenon of light scattering that is observed when a light wave is materially limited (J-P. PEREZ—Optique, Fondements et applications—7$^{th}$ edition—DUNOD—October 2004, p. 262). If a regular variation is present on the component, it causes light diffraction. As a result of this diffraction, a point of light is no longer perceived as a point through the optical component. The resulting macroscopic diffusion, or incoherent diffusion, produces a milky appearance or diffusion halo, of the cell structure of the optical component. In particular, a point light source appears through the optical component as a disc of light, or as being encircled by one or more rings of light. This results in a loss of contrast of an image which is observed through the component. This loss of contrast is similar to a reduction in the transparency, as previously defined. When the diffracting objects are arranged periodically, a grating effect results, making diffraction orders appear. These diffraction orders give rise to unwanted images and reduce the contrast of the image and thus the transparency of the component. The image of a point light source is then encircled by small unwanted spots which are easily identified visually against a dark background, even if the fraction of the light energy distributed in these unwanted images is small.

Such a reduction in transparency is particularly unfavourable when the optical component is an ophthalmic lens, in particular a spectacles lens.

SUMMARY

An object of the present invention therefore consists in proposing a method for producing an optical component having cells filled with optical material, which makes it possible to obtain an increased level of transparency for the component.

It applies to a method comprising the following steps:

/1/ obtaining a base optical component comprising a set of separate cells juxtaposed parallel to a surface of this component, each cell being open with an opening section which is parallel to the surface of the component; and /2/ inserting the optical material inside each cell up to an average fill level which is determined for this cell, and which is measured in a direction perpendicular to the surface of the component.

According to the invention, random or pseudo-random variations in the average fill levels of the cells are introduced voluntarily between at least some cells of the component.

Moreover, these variations in the fill level of the cells are determined so that phase shifts respectively for rays of visible light which pass through the cells along the direction perpendicular to the surface of the component have a root mean square deviation which is less than a quarter of the wavelength ($\lambda$).

Within the meaning of the invention, by random or pseudo-random variations of the fill levels of the cells is meant variations which do not have a regular appearance over the extent of the surface of the optical component. In particular, they have no apparent periodic character. Such variations may be determined digitally. They are then qualified as pseudo-random, even though they are comparable to random variations for each optical component produced.

Introducing such random or pseudo-random variations in the fill levels of the cells, according to a first feature of the invention, prevents any light diffusion that could cause phenomena linked with too regular filling of the cells, or reduces this diffusion to a level which is compatible with the use of the optical component. Thus a filling of the cells with random or pseudo-random variation makes it possible to limit the order produced by a grating resulting from a periodic filling. This makes it possible to avoid the formation of ghost images, due in particular to a spreading of the light energy over a larger solid angle. As a consequence, the image transmitted through such optical component is improved, in terms of transparency, as the light spots are transformed into a diffusion halo.

By fill level of a cell is also meant the average fill level of the latter when the surface of the optical material in the opening section is not flat or is not parallel to the surface of the component. In fact, the surface of the optical material in the opening section of each cell may have a variable shape, which depends in particular on the nature of the optical material. For example, this is surface may be granular when the optical material is a powder, or a concave or convex meniscus when the optical material is a liquid, or also be oblique when it is a gel. The fill level of the cell is then determined by the average height of the surface of the optical material in the opening section, measured along the direction perpendicular to the surface of the component, and averaged over the extent of the opening section.

Finally, by "root mean square deviation" of a particular magnitude, denoted by $\phi$, is meant the statistical amount $\Delta_{rms}$ which is defined in standard manner by the following formula:

$$\Delta_{rms} = \sqrt{\frac{1}{N-1} \sum_{i=2}^{N} (\varphi_i - \Phi)^2}$$

where $\phi_i$ designates the $i^{th}$ measurement of the magnitude $\phi$, N is the number of measurements and $\phi$ is the average value of the magnitude $\phi$ estimated from these measurements. In a known manner, the thus-defined root mean square deviation $\Delta_{rms}$ may be considered as the standard deviation of the magnitude $\phi$ when the number of measurements N is sufficiently large. Within the framework of the present invention, the magnitude $\phi$ is the phase shift for a ray of visible light which passes through one of the cells of the component perpendicularly to the surface of the component. Each measurement i is the value of this phase shift when the cell in question varies. It depends on the fill level of the cell. The number N of measurements to be considered in order to calculate the amount $\Delta_{rms}$ may be any greater than 3. In particular, $\Delta_{rms}$ may be calculated for N equal to 6, 10 or 20.

According to a second feature of the invention, the phase shifts which correspond to different cells of the optical component have a root mean square deviation which is less than a quarter of the wavelength ($\lambda$). As a result of this constraint imposed on the root mean square deviation, the variations of the fill levels of the cells do not introduce a significant local deformation of a light wavefront, so that no loss of contrast is perceptible. The optical component then has a high optical quality and level of transparency.

Preferably, the phase shifts of the light rays which pass through the cells of the optical component have a root mean square deviation which is less than a quarter, or an eighth or a fourteenth of the wavelength ($\lambda$). In the latter case, approximately 68% of the light energy which is emitted by a point light source through the component is concentrated in the Airy disk. This disk characterizes the optical diffusion of the component, in a manner known to a person skilled in the art.

The point light source is then perceived as a point of light through the optical component, in a satisfactory manner.

According to a first improvement of the invention, the method may also comprise the following step:

/3/ sealing the cells using a portion of a sealing material which extends over the opening section of each cell.

Filling the cells according to the invention is then permanently completed by such sealing of the cells and remains unchanged during any subsequent steps of producing the component and its use. The transparency of the component which is obtained as a result of implementing the invention is thus permanent.

Step /3/ may comprise placing a transparent film on the cell set, fixing this film onto separation walls which are situated between the cells. In this manner, all the cells of the component are sealed in a single step which is simple and rapid.

According to a second improvement of the invention, the base optical component may comprise a layered structure which itself incorporates the cell set. This layered structure may then be fixed on a substrate of the optical component after step /2/. The layered structure may in particular have a flat general configuration while step /2/ is carried out, which makes it possible to insert the optical material into the cells more rapidly.

The transparent optical component to which the invention is applied may be any whatsoever. This may be a lens, in particular a lens of an optical measurement device or visor, a lens of a protective or sports mask, a helmet visor, etc. The application of the invention to the production of an ophthalmic lens is particularly advantageous. By ophthalmic lens is meant any optical element which is intended to be placed in front of the eye of a wearer, in particular for correcting the latter's vision, improving visual comfort, or providing greater safety thereto. This may be a contact lens, an ocular implant or an ophthalmic spectacles lens suitable for assembly in a frame of a pair of spectacles.

The invention also proposes a transparent optical component which comprises a set of separate cells juxtaposed parallel to a surface of this component, each cell being filled with an optical material up to an average fill level which is measured for this cell along a direction perpendicular to the surface of the component. According to the invention, the average fill levels of the cells have random or pseudo-random variations between at least some cells of the component. Moreover, the variations of the fill levels between different cells are adapted so that phase shifts respectively for rays of visible light which pass through the cells along the direction perpendicular to the surface of the component have a root mean square deviation which is less than a quarter of the wavelength ($\lambda$). Preferentially, this root mean square deviation may be less than one eighth of the wavelength ($\lambda$) and advantageously less than one fourteenth of the wavelength ($\lambda$).

Such a transparent optical component may be produced, in particular, by using a method as described previously.

BRIEF DESCRIPTION OF THE DRAWINGS

Other features and advantages of the present invention will become apparent from the following description of a non-limitative embodiment, with reference to the attached drawings in which.

DETAILED DESCRIPTION

In these figures, for reasons of clarity, the dimensions of the different elements represented do not correspond to actual dimensions and dimensional relationships. Dimensions which correspond to actual optical components according to the invention are given below, by way of illustration in order to enable the invention to be reproduced from the description given. Moreover, it is understood that the steps of the method described and the optical principles mentioned which are known to a person skilled in the art are not given in detail, and reference may be made if necessary to one of the many documents available on these subjects.

Figure 1:
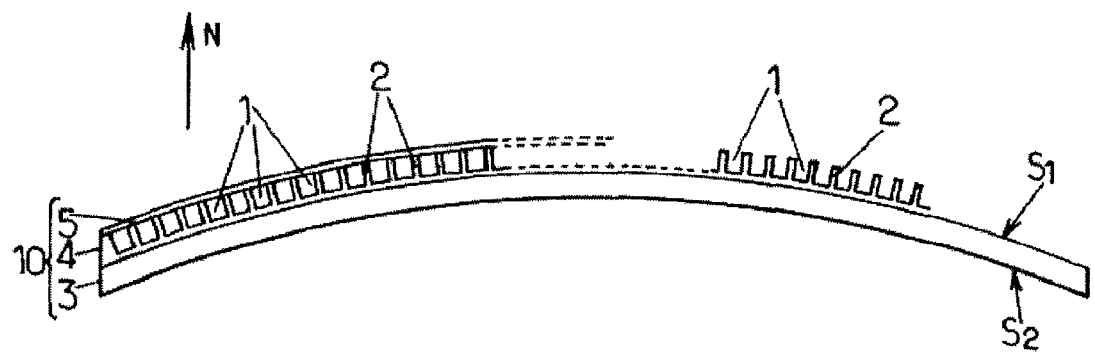
FIG. 1 is a sectional view of an optical component according to the invention.

As shown in FIG. 1, a spectacle lens blank, for example having a circular shape in a plane perpendicular to that of the figure, may have a convex face S1 and a concave face S2. The blank is referenced generally as 10. Faces S1 and S2 may be parallel, or have different curvatures. One or both of these may also be flat. The blank 10 is intended to be cut out to the dimensions of an ophthalmic lens seat of a spectacle frame selected by a future wearer thereof. The final optical component which is obtained is then the spectacles lens.

The blank 10 is provided with a set of cells 1 which are juxtaposed side by side on the face S1. The cells 1 are separated by walls 2 which form a network on the face S1. The walls 2 extend parallel to a direction perpendicular to the face S1, denoted by N. The blank 10 may comprise a substrate 3 and a layered structure 4 in which the cells 1 are formed. The substrate 3 may be constituted by any transparent material which is commonly used in the ophthalmic field. This material may be, in particular, a mineral, organic or composite material. The structure 4 is joined to the substrate 3, for example by bonding. It may be partially made of lithographic resin, so that the cells 1 may be formed by combining a selective irradiation and dissolution of the resin, using a method known to a person skilled in the art. Alternatively, the cells 1 may be formed directly on the substrate 3.

Preferably, and particularly when the face of the final optical component which is intended to carry the cell set is not flat, the method of the invention is implemented with the layered structure 4 before this structure is applied onto the substrate 3. The structure 4 may then have a general configuration which is flat, making it easier to fill the cells 1 with active material. The base optical component from which the invention is implemented is then constituted by the layered structure 4 without the substrate 3. Generally, the base optical component comprises the cell set and, optionally, a substrate which may be temporary or permanent.

Each cell 1 may have a substantially cylindrical shape, with its axis parallel to the direction N, and of any section whatsoever. It is initially open on one side of the structure 4, which is the same for all the cells (see the right-hand side of FIG. 1). It thus has an opening section which may be equal to the section of the cell over the whole of its height, to facilitate the filling thereof. By way of example, the cells 1 may have dimensions parallel to the surface S1, denoted by d on FIG. 2, which are comprised between 50 and 200 μm (micromiter), and a height h which is comprised between 2 and 50 μm, measured along the direction N. The thickness e of the wall 2 may be comprised between 1 and 20 μm.

An optical material is inserted into the cells 1. It may be identical or vary between different cells, depending on the optical function which is sought for the final lens. The quantity of this material which is inserted into each cell is monitored. This defines the fill level of the cell, which is measured along the direction N and may be determined in various ways. For example, the fill level of a cell may be optically monitored in real time during filling. In a preferred manner, the fill level of each cell is determined digitally, for example using a computer controlling the quantity of optical material to insert into this cell.

The respective fill levels of the cells 1 may vary continuously or in a discontinuous manner. For example, the optical material may be inserted into each cell in the form of multiple portions each having one same basic volume. The fill level can then be easily varied between different cells by varying the number of portions which are inserted into these cells. The variations of the fill levels thus obtained are multiple of the basic volume. For example, this basic volume may be comprised between 0.1 and 50 picoliters. For the cells 1 which have a circular section with a diameter d equal to 100 μm, a basic volume of 6 picoliters corresponds to a variation approximately 0.76 μm for the average fill level of a cell.

According to a particularly rapid embodiment of the invention, the optical material may be inserted into each cell by using a nozzle for spraying a substance. Such a nozzle, called an "inkjet nozzle" or "inkjet head", is commercially available and can be digitally controlled. It is particularly suitable when the optical material is a liquid, or a gel. The nozzle is moved in front of the cell set 1 using an XY movement system, and is activated when it is in front of the opening section of a determined cell, in order to spray the desired quantity of optical material therein.

Figure 2:
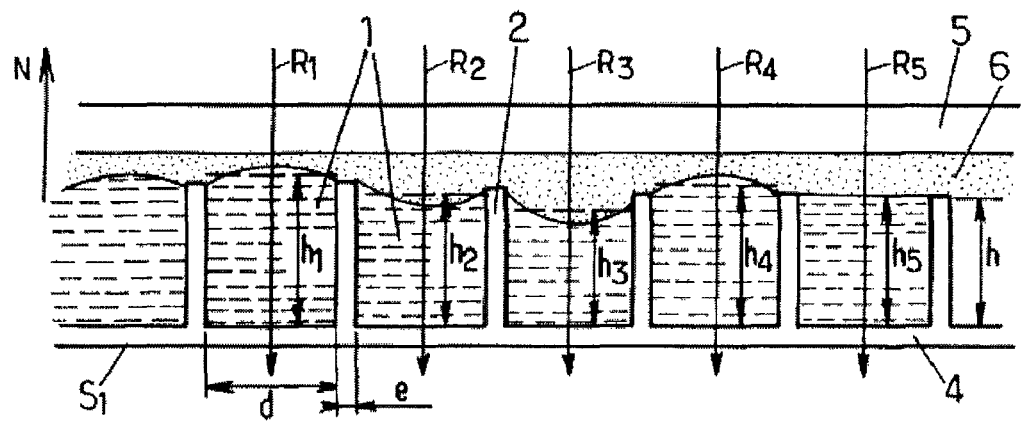
FIG. 2 is a sectional view of several cells which shows a determination of the fill levels.

FIG. 2 is a sectional view of the layered structure 4, showing variations in the fill level of the cells 1. The surface of the optical material in the opening section of the cells may have different shapes. For example, when the optical material is a liquid, this surface may be convex or concave, with a greater or lesser curvature. In this case, the fill level of a cell corresponds to the average height of the surface of the liquid, as shown in FIG. 2 for the levels denoted by $h_1$ to $h_5$.

The quantity of optical material which is inserted into different cells is varied as desired, in a random or pseudo-random manner, so that the fill levels of the cells vary randomly from one cell to another as a consequence.

The average phase shift for a ray of visible light which passes through a cell 1 parallel to the direction N will now be considered. In FIG. 2, $R_1, \ldots, R_5$ denote the light rays which pass through the cells 1 shown. The average phase shift of the light ray which passes through the cell i, marked $\phi_i$, equals $2\pi \cdot \Delta n \cdot h_i / \lambda$, where $\lambda$ designates a wavelength of the light, and $h_i$ is the average fill level of the cell i. $\Delta n$ is the difference between the refractive index n of the optical material which is contained in the cell i, for the wavelength $\lambda$, and a refractive index of a material 6 which is arranged above this cell (see FIG. 2). The root mean square deviation of these phase shifts, denoted $\Delta_{rms}$ and s calculated according to Formula 1 from several cells 1 identified by the index i, is approximately equal to $2\pi \cdot \Delta n \cdot h_{rms} / \lambda$, where $h_{rms}$ designates the root mean square deviation of the fill levels. A condition for validity of such an estimation of $\Delta_{rms}$ is that the variations of the fill levels are greater, in relative values, than those of the refractive index n of the optical material, if this latter varies between different cells. By way of illustration, the wavelength $\lambda$ may be taken as 0.55 nm, corresponding to a green colour. The average index n of the optical material which is contained in the cells 1 may be equal to 1.52 for this wavelength, and that of the material 6 may be equal to 1.50. Then $\Delta n$ is equal to 0.02.

According to the invention, the fill levels of the cells 1 are varied in a controlled manner so that the root mean square deviation $\Delta_{rms}$ is less than $\pi/2$, even less than $\pi/4$, or $\pi/7$, i.e.

less than one quarter of the wavelength ($\lambda$), even less than one eighth of the wavelength, or one fourteenth of the wavelength. This latter case results to $h_{rms}<1.96$ μm for the numerical values quoted above. Now for most of the continuous statistical distributions of magnitude, the root mean square deviation $\Delta_{rms}$ is comprised between one half and one seventh of the maximum variation of the magnitude: $\Delta_{rms}$ is comprised between $\Delta_{max}/7$ and $\Delta_{max}/2$. In other words, $\Delta_{max}$ is comprised between $2\cdot\Delta_{rms}$ and $7\cdot\Delta_{rms}$. In the present case, values for $\Delta_{max}$ are obtained which are comprised between 1.96 μm and 6.86 μm. Such maximum values for the variations of the fill levels of the cells 1 may be achieved using the basic volume of 6 picoliters for the unit portion of optical material which is inserted at one same time into each cell 1. In fact, this basic volume corresponds to a variation of 0.76 μm of the fill level of a cell, as stated above.

When the optical material and the material 6 are chosen so that $\Delta n$ is equal to 0.15, the values for $\Delta_{max}$ which are obtained as described above are also compatible with the use of a nozzle for spraying a substance.

Once the cells 1 are filled with optical material in the manner just described, a transparent film may be placed over the set of the cells 1, by fixing it onto the walls 2 in order to seal each cell. This sealing film is referenced 5 in the figures. It may be heat-sealed on the tops of the walls 2 but is preferably bonded onto the structure 4 using an intermediate layer 6 of an adhesive material. The adhesive material used may be a pressure sensitive adhesive material, commonly known as PSA. It is preferably sufficiently fluid to be distributed at the opening sections of the cells 1 while compensating for the variations in the fill levels of the cells. Optionally, the structure 4 thus assembled with the sealing film 5 may undergo ultraviolet radiation in order to permanently fix the adhesive material 6, and thus the assembly.

When the cells 1 have been filled before assembly of the layered structure 4 with the permanent substrate 3 of the blank 10, the structure 4 is then fixed onto the substrate 3, for example by bonding.

It is understood that the implementation of the invention which has just been described in detail may be modified in various ways while retaining at least some of the advantages thereof.

Finally, it is specified that the optical material which is inserted into the cells may be of any type whatsoever, and in particular one of the types already in current use in optical components having cells.

The invention claimed is:

1. Method for the production of a transparent optical component having cells filled with optical material, said method comprising the following steps:
    /1/ obtaining a base optical component comprising a set of separate cells juxtaposed parallel to a surface of said component, each cell being open with an opening section parallel to the surface of the component; and
    /2/ introducing an optical material into the inside of each cell up to an average fill level ($h_1, \ldots, h_5$) determined for this cell, and measured along a direction perpendicular to the surface of the component,
    wherein random or pseudo-random variations of the average fill levels of the cells ($h_1 \ldots, h_5$) are introduced voluntarily between at least some of the cells of the component,
    the variations of the fill levels ($h_1 \ldots, h_5$) between the different cells of the component are determined so that phase shifts respectively for rays of a visible light ($R_1 \ldots, R_5$) passing through the cells along said direction perpendicular to the surface of the component have a root mean square deviation of less than one quarter of a wavelength ($\lambda$) of said light, and
    said fill levels of the cells are selected so as to exhibit a discontinuity between at least two of the cells.

2. Method according to claim 1, characterized in that the variations of the fill levels ($h_1 \ldots, h_5$) are determined so that the phase shifts respectively for the rays of visible light ($R_1 \ldots, R_5$) passing through the cells along the direction perpendicular to the surface of the component have a root mean square deviation of less than one eighth of the wavelength ($\lambda$).

3. Method according to claim 1, wherein the respective fill levels of the cells ($h_1 \ldots, h_5$) are digitally determined.

4. Method according to claim 1, wherein the optical material is inserted into each cell in step /2/ in the form of multiple portions, each having one same basic volume, and wherein the variations in the fill levels ($h_1 \ldots, h_5$) are produced by varying the number of portions introduced into different cells of the component.

5. Method according to claim 4, wherein said basic volume is comprised between 0.1 and 50 picoliters.

6. Method according to claim 1, wherein the optical material is inserted into each cell in step /2/ using a nozzle for spraying a substance.

7. Method according to claim 1, further comprising the following step:
    /3/ sealing the cells using a portion of a sealing material extending over the opening section of each cell.

8. Method according to claim 7, wherein the step /3/ comprises arranging a transparent film over the cell set, said film being fixed onto separation walls situated between the cells.

9. Method according to claim 1, wherein the transparent optical component comprises a lens.

10. Method according to claim 9, wherein the transparent optical component comprises an ophthalmic spectacle lens.

11. Method according to claim 1, wherein the base optical component comprises a layered structure itself incorporating the set of cells, and wherein said layered structure is fixed on a substrate of the optical component after step /2/.

12. Transparent optical component comprising a set of separate cells juxtaposed parallel to a surface of said component, each cell being filled with an optical material up to an average fill level ($h_1 \ldots, h_5$) measured for said cell along a direction perpendicular to the surface of the component,
    wherein the average fill levels of the cells ($h_1 \ldots, h_5$) have random or pseudo-random variations between at least some of the cells of the component,
    the variations in the fill levels ($h_1 \ldots, h_5$) between different cells are adapted so that the phase shifts respectively for rays of a visible light ($R_1 \ldots, R_5$) passing through the cells along said direction perpendicular to the surface of the component have a root mean square deviation of less than one quarter of a wavelength ($\lambda$) of said light, and
    said fill levels of the cells are selected so as to exhibit a discontinuity between at least two of the cells.

13. Component according to claim 12, characterized in that the variations of the fill levels ($h_1 \ldots, h_5$) are adapted so that the phase shifts respectively for the rays of visible light ($R_1 \ldots, R_5$) passing through the cells along the direction perpendicular to the surface of the component have a root mean square deviation of less than one eighth of the wavelength ($\lambda$).

14. Component according to claim 12, wherein the variations of the fill levels ($h_1 \ldots, h_5$) are multiple of one same basic volume.

15. Method according to claim 14, in which said basic volume is comprised between 0.1 and 50 picoliters.

16. Component according to claim 12, further comprising a transparent film arranged on the cell set, and fixed onto separation walls situated between the cells in order to seal each cell.

17. Component according to claim 12, comprising a lens.

18. Component according to claim 17, comprising an ophthalmic spectacle lens.

19. Component according to claim 12, comprising a substrate and a layered structure in which the cell set is formed, said layered structure being fixed on said substrate.

* * * * *